United States Patent

[11] 3,565,235

| [72] | Inventors | Warren M. Brown<br>Lancaster;<br>Cecil P. Roberts, Carroll, Ohio |
|---|---|---|
| [21] | Appl. No. | 763,200 |
| [22] | Filed | Sept. 27, 1968 |
| [45] | Patented | Feb. 23, 1971 |
| [73] | Assignee | Anchor Hocking Corporation<br>Lancaster, Ohio |

[54] CONVEYOR TRANSFER APPARATUS
5 Claims, 5 Drawing Figs.

[52] U.S. Cl............................................. 198/34,
198/76
[51] Int. Cl......................................... B65g 47/26
[50] Field of Search........................... 198/34, 76,
104, 22(Cursory)

[56] References Cited
UNITED STATES PATENTS

| 2,857,037 | 10/1958 | Breeback | (198/34AUX) |
| 2,890,787 | 6/1959 | Carter | 198/34(A) |
| 3,101,830 | 8/1963 | Webster | 198/34X |
| 3,314,519 | 4/1967 | Kelly | 198/34X |

FOREIGN PATENTS

| 547,442 | 5/1956 | Belgium | 198/34(A) |
| 831,653 | 1/1956 | Germany | 198/104 |

*Primary Examiner*—Gerald M. Forlenza
*Assistant Examiner*—Frank E. Werner
*Attorney*—Norman N. Holland ABSTRACT: An auxiliary conveyor device for transferring articles such as filled containers from a first machine or conveyor to a second machine or conveyor where the first and second machines or conveyors are operating at differing speeds. The auxiliary transfer means includes a third or auxiliary supporting conveyor positioned between the first and second conveyors and a helicoid with jar engaging flights. The helicoid is angularly aligned above the three conveyors to engage the moving articles and to control their speed and spacing as the articles are moved from the first conveyor to the second over the intermediate conveyor under control of the helicoid.

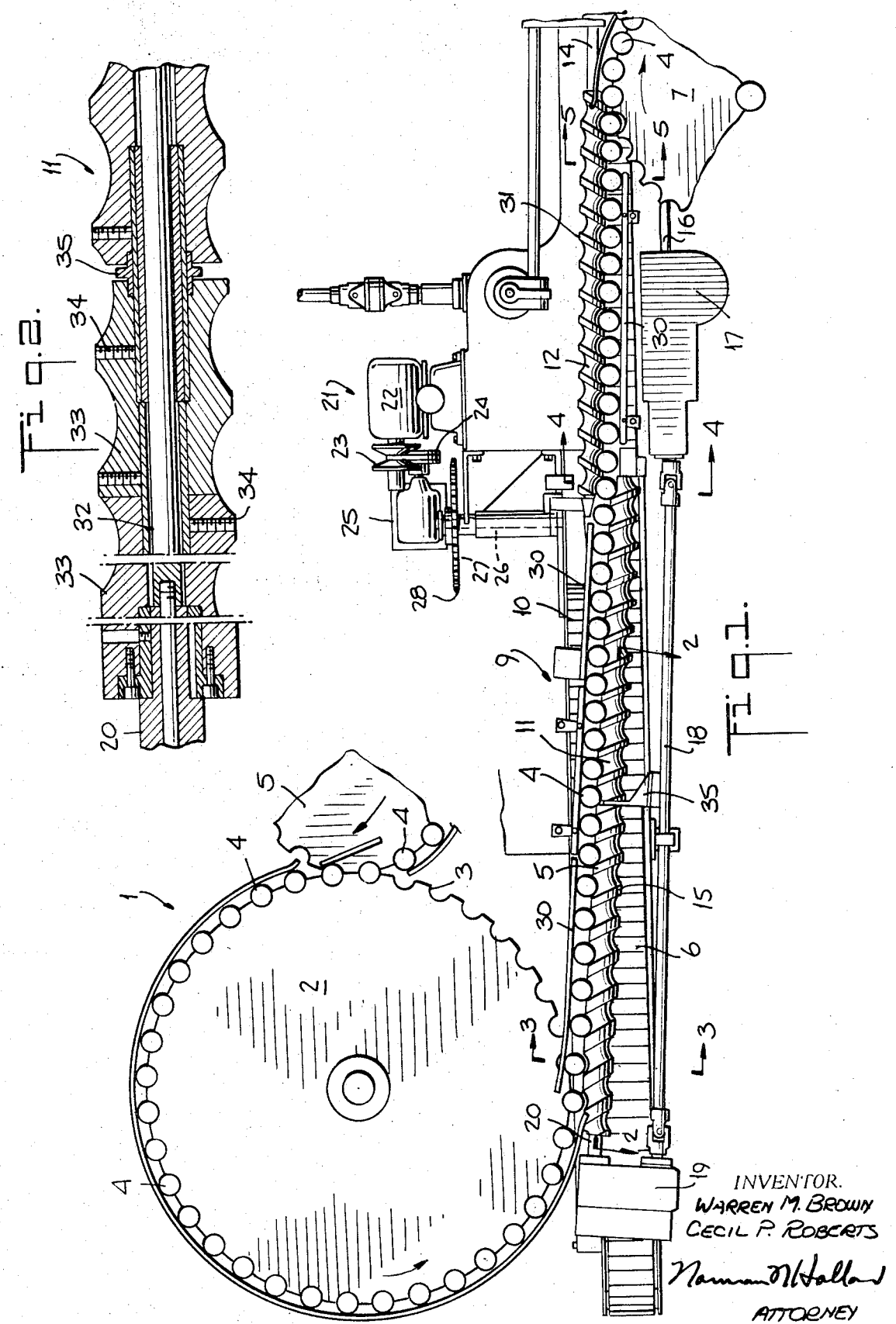

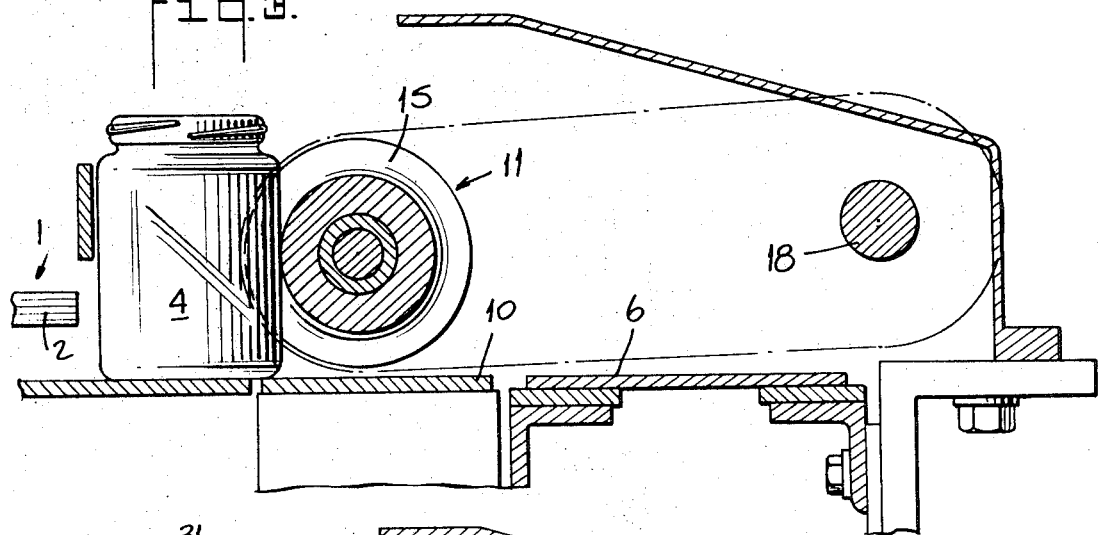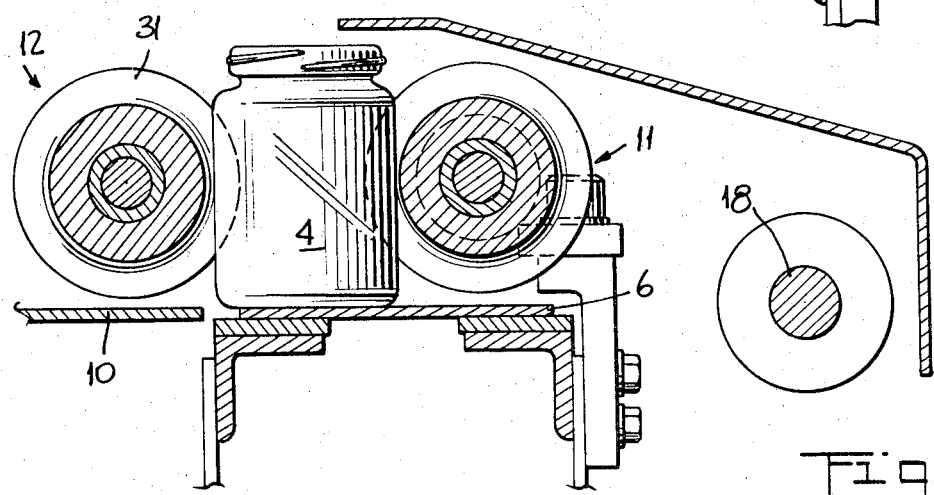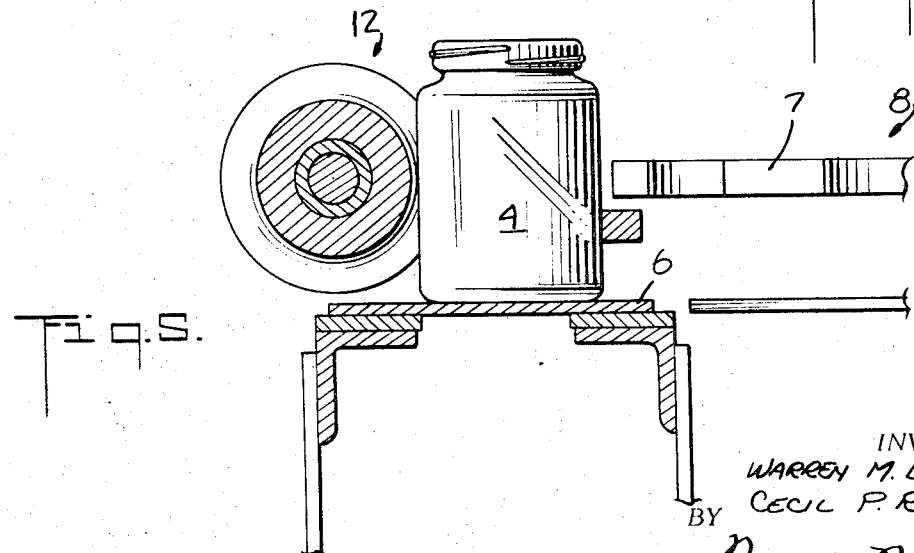

CONVEYOR TRANSFER APPARATUS

BACKGROUND OF THE INVENTION

This article transfer device is for transferring moving articles from one conveyor to another and is also of the type particularly adapted for handling containers in packaging lines such as are used to fill glass containers and to seal the filled containers with a closure cap. In such sealing lines the containers are transferred between the various operating stations or machines including filling and sealing machines. The containers may pass successfully, for example, from washing machines to filling machines and then to sealing and labeling machines and vacuum testing machines.

Modern sealing machines of this type are run at extremely high speeds to be economically useful and the various other stations or machines within the sealing line are also preferably run at high speeds to assure efficient and economical operation of the individual units. Since the various individual machines perform differing functions their most efficient operating speeds differ and the containers leave them at differing rates. In such high speed operation, it is essential for the containers to be smoothly and precisely moved from one machine to another to prevent spillage, breakage, and a buildup or jam of the conveyed containers. Obtaining a suitably smooth transfer between stations is complicated significantly by the above noted difference in the speeds of operation of the adjacent machines or stations.

One example of this occurs in container sealing lines where containers are being filled at high speeds by filling machines run at a fixed rate and where these filled containers must be transferred quickly and smoothly to a high speed sealing unit which runs most efficiently at a differing and usually a lower speed than that of the filling apparatus.

Prior attempts to very the speed of containers in a system of this type have included the use of container engaging lugs or helicoids mounted above and in direct line with the path of the sealing machine feed conveyor. These devices have been found to subject the filled containers to an abrupt change in their rate of movement or direction and have resulted in an undue amount of product spillage, container breakage, and fallen containers.

SUMMARY OF THE INVENTION

The present invention is adapted to both change the direction of moving containers and to simultaneously provide a controlled speed reduction or spacing change for the moving containers in such a manner that the containers change both speed and direction smoothly and progressively and without any abrupt changes in direction and speed which would damage the containers or tend to spill their contents. This result is obtained by including an auxiliary supporting conveyor moving at a differing speed from the spaced input and outlet conveyors and by providing an angularly aligned auxiliary helicoid positioned over the conveyors whose flights or pockets between flights are arranged to provide the controlled speed reduction and article spacing action.

Accordingly, an object of the present invention is to provide an improved article transfer device such as is used in container sealing lines or the like.

Another object of the present invention is to provide an improved auxiliary conveyor for changing the speed and direction of unsealed and filled containers in a smooth and controlled manner.

Another object of the present invention is to provide an improved supporting conveyor and cooperating helicoid arrangement for changing the spacing of moving articles such as containers and the like.

S Another object of the present invention is to provide an improved auxiliary conveyor means for reducing the spacing between serially aligned articles being fed into machines such as sealing machines and the like.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings, forming a part of the specification; wherein:

FIG. 1 is a top plan view of a preferred embodiment of the transfer system of the present invention;

FIG. 2 is a fragmentary sectional view of the preferred helicoid taken along line 2–2 on FIG. 1; and FIGS. 3, 4 and 5 are vertical sectional views of the system taken along lines 3–3, 4–4, and 5–5 respectively on FIG. 1

DESCRIPTION OF THE PREFERRED EMBODIMENT

FIG. 1 at the left-hand side illustrates a typical rotary container filling machine 1 having a rotary container transport dial or turret 2. A turret of this type, for example, may have about 36 container receiving pockets 3. These pockets 3 receive empty containers 4 from a feed table 5 and move the containers 4 beneath automatically controlled filling nozzles which inject a predetermined amount of product into each of the containers 4. Such fillers are well known and are included herein to facilitate the description. The filler itself does not comprise a portion of the present invention.

Such filling devices are normally constructed with fixed jar spacing such that these spacings cannot be adjusted to match the similarly fixed spacing of many capping machines. Since the jars per minute rate of filler and capper must match, the linear velocity of said jars often varies considerably from filler to capper.

A feed conveyor 6 is shown for moving the filled containers 4 into a feed table 7 or other container support and spacer for the container sealing machine. Such sealing machines, for example, may be straight line sealing machines of the type illustrated in U.S. Pat. No. 3,274,748 dated Sept. 27, 1966 of C.P. Roberts and owned by the assignee of the present invention or a rotary sealing machine as illustrated in U.S. Pat. No. 3,049,492 dated Jun. 26, 1962 of H.E. Stover also owned by the assignee of the present invention. Such sealing machines preferably receive the filled containers moving at constant speed and uniformly spaced for movement to the sealing elements.

The auxiliary transfer means 9 of the present invention which receives the filled jars or containers 4 from the filling machine 1 and which transfers them to the input 7 of the sealing machine with a changed speed and spacing will now be described in detail.

The basic element of this transfer means comprise a generally horizontally auxiliary jar moving conveyor 10 driven at a controlled speed differing, as will be described below, from that of the filler 1 and the angularly aligned container engaging helicoids 11 and 12 passing over this conveyor 10 as well as over feed conveyor 6. These elements arranged as will be further described and together with suitable guide rails and drive means provide the controlled speed change and spacing change for the moving containers.

As indicated above, a typical straight line horizontal feed conveyor 6 is shown feeding the filled containers 4 with uniform spacing and with a predetermined rate of movement into a typical sealing machine container receiving means 7. This conveyor may comprise a conveyor belt having pivotally connected metal links and which is mounted on suitable end sprockets (not shown). This conveyor 6 is driven by a suitable power takeoff from the sealing machine such as by a drive coupling including a power takeoff from the main sealing motor (not shown). Similarly the sealing machine feed helicoid 12 is driven in synchronism with the sealing machine 8 and the feed conveyor 6 by a suitable coupling arrangement such as by a drive shaft 14 on the sealing machine 8 which turns the helicoid 12 at the proper rate so that its flights advance the containers 4 at the same speed as the feed conveyor 6.

The angularly aligned transfer helicoid 11 also may be driven in timed relationship with the sealing machine 8 and its flights or fins 15 have a variable pitch which combines with the helicoid rotational speed causes a change in container 4 speed and spacing to adjust them for the container spacing required for a particular sealing machine. The drive for the transfer helicoid 11, for example, may be coupled to the sealing machine 8 from a convenient output drive shaft 16 through a first gear box 17, an elongated drive shaft 18, and end gear box 19 having its gear train arranged to provide the desired rotational speed for the drive shaft 20 of the transfer helicoid 11. The above drive connections for the conveyors and helicoids are by the usual and known means and preferably are all positively coupled by means of gears, shafts, drive chains, sprockets, and the like to the sealing machine drive so that the proper ratios of drive speeds are continually controlled by the related sealing machine operation and remain in a continuing fixed relationship to that operation.

The drive means for the auxiliary conveyor 10 is preferably a variable or adjustable speed drive 21. A preferred embodiment, for example, is illustrated in FIG. 1 which includes a synchronous electric or other constant speed drive motor 22 having a precisely and easily adjustable speed output such as a conical pulley 23 and related V-belt 24. The V-belt 24 in turn operates, through a speed reduction box 25 having an output sprocket (not shown) coupled to a conveyor drive shaft 26 by a sprocket 28 by a suitable chain 27. This arrangement permits the speed of the auxiliary conveyor 10 to be varied and permits the conveyor 10 to be run at a slightly higher speed than that of the sealing machine feed conveyor and the container advancing rate of the flights 15 of the transfer helicoid 11. This higher speed or movement of the auxiliary conveyor 10 moves the containers 4 being transferred from the filling machine turret 2 into the forward portion of the pockets between the helicoid flights. This support action against the flights stabilizes the containers and ensures a precise control for the reduced spacing of the containers as they move forward under combined action of the helicoid 11, the auxiliary conveyor 10 and the guide rails 30.

FIG. 3 illustrates a container 4 passing from the filler 1 onto the auxiliary conveyor 10 and as the auxiliary conveyor 10 moves the container 4 into a helicoid pocket and against the forward portion of the fin or flight 15 defining the pocket. When the container 4 has been moved further forward to the point illustrated in FIG. 4, the container 4 will be fully seated on the main sealing machine feed conveyor 6 and the container 4 will be correctly positioned between the adjacent and opposed pockets of the transfer helicoid 11 and the sealing machine feed helicoid 12.

As illustrated at the right-hand end of FIG. 1, the feed helicoid 12 preferably may also be angularly aligned with respect to the feed conveyor 6 to move each of the containers 4 into the proper pocket of the sealing machine feed dial or turret.

FIG. 2 illustrates a preferred embodiment of the transfer helicoid 11. It is seen to have a center support and drive shaft 32 coupled to the end drive shaft 20. Different entry sections 33 for helicoid may be mounted on shaft 32 to change the container 4 spacing as required either increasing it or decreasing it for the particular filler 1 or sealing machine 8 being used. The right-hand portion or terminal portion of the helicoid 11 may be removably mounted on the right-hand end of the shaft 32 and may have a uniform pitch equal to the final container spacing desired on conveyor 6 to control the transfer of the containers 4 after the revised spacing has already been provided by the above-described varying pitch portion of the helicoid 11. Setscrews 34 permit an alignment of the helicoid section 33 with the terminal portion of helicoid 11 to assure a correct helicoid fin 15 alignment across the bearing support 35.

It will be seen that an improved article transfer conveyor means has been provided which will change article speeds and spacing as the articles are conveyed from one point to another. In particular, an improved transfer device has been provided which provides the speed and spacing changes in a smooth controlled manner. Such a system, for example, is seen to be particularly useful in handling delicate or sensitive articles such as filled and unsealed containers. The design is particularly useful in this regard for transferring filled and unsealed containers from a filling machine having a certain fixed container spacing to the sealing machine having another fixed container spacing.

A transfer device in accordance with the invention and as described above, will perform the necessary container speed change and spacing change without damaging or spilling or tilting containers which have been almost completely filled.

As various changes may be made in the form, construction and arrangement of the parts herein without departing from the spirit and scope of the invention and without sacrificing and any of its advantages, it is to be understood that all matter herein is to be interpreted as illustrative and not in a limiting sense.

We claim:

1. Means for changing the spacing of moving articles comprising a first conveyor having a generally horizontal article moving run, a second conveyor positioned adjacent said first conveyor having a generally horizontal article moving run on a level with the article moving run of said first conveyor, drive means for moving the conveyors in the said direction, a first helicoid mounted above said conveyors having an article engaging spiral flight, said helicoid having its entrance end positioned over said second conveyor whereby articles in pockets between the helicoid flights move from one conveyor to the other, said flights of the helicoid having a progressively varied spacing in the direction of conveyor movement for changing the spacing of the moving articles as the articles move from the first conveyor to the second conveyor, a second article moving helicoid positioned over said second conveyor beyond said first helicoid, said second helicoid having uniformly spaced article engaging flights whose spacing corresponds to that of the containers being fed from the second conveyor, said second helicoid being angularly aligned with respect to the path of said second conveyor whereby the articles being moved by the helicoid flights are moved laterally of said second conveyor as they move towards its end.

2. Means for transporting articles from the output of one machine to the input of another machine where the articles are being passed through the machines at differing rates and with differing spacing comprising the combination of a first conveyor having a portion of a horizontal upper run positioned adjacent the article output of the first machine, a second article conveyor having a horizontal upper run generally parallel to and adjacent to and on a level with the upper run of the first conveyor, a first helicoid positioned above said conveyors in position to engage articles from moving thereon and being angularly aligned to extend from a position over the first conveyor for the entrance end of the helicoid to a position over the second conveyor for the outlet end of the helicoid, guide means positioned outwardly of the helicoid for directing articles moving on the first and second conveyors into pockets between the helicoid flights, the spacing between the helicoid flights on said helicoid being progressively reduced to reduce the spacing between the moving articles as they are advanced by the helicoid and the conveyors whereby the spacing of the moving articles is adjusted in accordance with the changed helicoid flight spacing. a second article moving helicoid positioned over said second conveyor beyond said first helicoid, said second helicoid having uniformly spaced article engaging flights whose spacing corresponds to that of the containers being fed from the second conveyor, said second helicoid being angularly aligned with respect to the path of said second conveyor whereby the articles being moved by the helicoid flights are moved laterally of said second conveyor as they move towards its end.

3. Means for transferring containers in a container sealing line from the output of one machine to the input of another machine where the articles are being passed through the machines at differing rates and with differing spacing comprising the combination of a first horizontal conveyor having a portion of an upper run positioned adjacent the output of the first machine, a second elongated conveyor having an upper run generally parallel to and adjacent to and on a level with the upper run of the first conveyor, a first helicoid positioned over said conveyors in position to engage containers thereon and being angularly aligned to extend from the position adjacent the outlet of the first machines at the entrance end of the helicoid to a position over the second conveyor at the outlet end of the helicoid, guide means positioned outwardly of the helicoid for directing containers moving on the first and second conveyors into pockets between the helicoid flights. the spacing between the helicoid flights being progressively reduced to reduce the spacing between the moving containers as they are advanced by the helicoid and the conveyors whereby the spacing of the moving containers is adjusted in accordance with the changed helicoid flight spacing, and drive means for said conveyors for moving the first conveyor at a faster rate than said second conveyor, said second helicoid being angularly aligned with respect to the path of said second conveyor whereby the articles being moved by the helicoid flights are moved laterally of said second conveyor as they move towards its end.

4. Means for changing the spacing of moving articles comprising, a first conveyor having a generally horizontal article moving run, a second conveyor positioned adjacent said first conveyor having a generally horizontal article moving run, drive means for each conveyor which move the conveyors in the same direction with the first conveyor being moved faster than the second conveyor, and a single helicoid mounted above the conveyors having an article engaging spiral flight and having its entrance end positioned over the first conveyor and its exit over the second conveyor, the magnitude of the spacing between flights changing in a constant progressive manner along the axis of the helicoid such that an article engaged by the flights and transported along the axis of the helicoid will have its spacing from other articles changed from one spacing to another.

5. Means as claimed to claim 4 which comprises a second helicoid at the exit end of the first helicoid to receive articles therefrom, said second helicoid having a uniform spacing between its flights corresponding to the spacing at the exit end of the first helicoid.